UNITED STATES PATENT OFFICE.

THOMAS MACALPINE, OF CHISWICK, ENGLAND, ASSIGNOR TO ALCOHOL SYNDICATE, LIMITED, OF LONDON, ENGLAND.

PROCESS OF PREPARING AN ACETYLENE PREPARATION OF MANGANESE.

SPECIFICATION forming part of Letters Patent No. 686,663, dated November 12, 1901.

Original application filed May 25, 1899, Serial No. 718,303. Divided and this application filed October 12, 1899. Serial No. 733,434. (No specimens.)

*To all whom it may concern:*

Be it known that I, THOMAS MACALPINE, a subject of the Queen of Great Britain, residing at Chiswick, in the county of Middlesex, England, have invented certain new and useful Improvements in Processes of Preparing an Acetylene Preparation of Manganese; and I do hereby declare the following to be a full, clear, and exact description of the invention, such as will enable others skilled in the art to which it appertains to make and use the same.

My invention consists in an improved process for preparing a special manganese compound which can be advantageously used in the purification of mineral oils. This manganese compound is prepared in the following manner: To a solution or emulsion composed of water containing the oxids, hydrates, or carbonates of calcium, barium, magnesium, sodium, potassium, or ammonium is added a nearly-saturated solution of the permanganates or manganates of calcium, barium, magnesium, sodium, potassium, or ammonium. This compound solution is then treated with acetylene gas, as hereinafter stated. In practice I find it convenient to take a solution in water of carbonate of sodium or carbonate of potash, or of a mixture of the two, of a specific gravity of about 1.07, although it is to be understood that I do not restrict myself to these substances, but may use any of the substances mentioned above. To this solution I add a saturated or nearly-saturated solution in water of permanganate of potash. The point at which the addition of permanganate should be stopped can be determined by observing the color of the solution or emulsion. If an excess of permanganate is used, the color will be purplish red. Such excess is to be avoided. The addition of the permanganate should be stopped as soon as a faint reddish tinge appears in the solution or emulsion. It should be understood that I do not limit myself to the permanganate of potash, but that any of the permanganates or manganates mentioned above may be used, but I find the permanganates of potash to give the best results. When the amount of permanganate has been added, the mixture is subjected to the intermittent action of acetylene gas for some time. The acetylene gas causes a precipitate containing the manganese to be thrown down, which precipitate is then separated by filtration in the usual manner and constitutes the special manganese compound according to this invention.

The above processes are usually conducted at the ordinary temperatures; but to accelerate the process the temperatures of the solutions may be slightly raised, and to increase the speed of absorption of the acetylene gas the latter may be introduced into the liquid mixture under pressure.

Having thus prepared my acetylene compound of manganese, I use it in the purification of mineral oil as follows: I take crude mineral oil and treat it with said manganese compound in the following manner: To one hundred gallons of oil I stir into it five pounds or thereabout of the manganese compound and allow the whole to rest for several hours or days, with occasional agitation for several hours. I then allow the mixture to settle, and when subsidence has taken place the oil is removed and distilled in the usual way.

Having now described my invention, what I desire to claim is—

1. The process of preparing a manganese compound which consists in subjecting a solution or emulsion of compounds of the alkalies or alkaline earths to the action of acetylene gas and adding to the resulting product a solution containing manganese, substantially as described.

2. The process of preparing a manganese compound which consists in subjecting a solution or emulsion of compounds of the alkalies or alkaline earths to the action of acetylene gas and adding to the resulting product a solution containing manganese and then subjecting the product to the further action of acetylene gas and separating out the precipitated compound of acetylene and manganese, substantially as described.

THOMAS MACALPINE.

Witnesses:
FREDERIC PRINCE,
JOHN STOREY.